Oct. 24, 1961   W. H. ELLENWOOD ET AL   3,005,439
INDIRECTLY ILLUMINATED POINTER FOR INDICATING DEVICES
Filed April 20, 1959

*INVENTORS*
WARREN H. ELLENWOOD
WILLIAM A. VOEHL by Leonard H. King

United States Patent Office 3,005,439
Patented Oct. 24, 1961

3,005,439
INDIRECTLY ILLUMINATED POINTER FOR
INDICATING DEVICES
Warren H. Ellenwood, New York, and William A. Voehl, White Plains, N.Y., assignors to Avien, Inc., Woodside, N.Y.
Filed Apr. 20, 1959, Ser. No. 807,654
2 Claims. (Cl. 116—136.5)

This invention relates to indicating apparatus and particularly to indirectly illuminated pointers employed with internally lighted instruments. Pointers of the type disclosed are especially adapted to be employed with aircraft instruments under night flight conditions wherein the dial pointer and the indicia on the dial face are made visible by indirect lighting means so that no direct source of light is exposed, thereby preserving the night vision capability of the pilot.

The light source normally red in color, is usually placed to the rear of the dial face and enclosed except for the extent necessary to illuminate the dial indicia and the dial pointer. The pointer is formed of a light conducting material. Light transmitting glass and certain plastics, such as polymethyl methacrylate, having suitable optical properties may be employed. A shaft of like material conducts the light from the light source to the pointer body. Because of the necessarily small dimensions involved, limited light collecting and transmitting capability exists and efficiency is important. A typical instrument utilizes a 1" long pointer having a maximum cross-sectional dimension of about 0.06" x .012". The use of high intensity lamps is impractical because of the heat generated and the temperature limitations of the component enclosed in the same casing.

It is therefore a principal feature of this invention to provide an improved pointer and light transmitting shaft for an indirectly illuminated pointer.

It is an object of this invention to provide an efficient light collecting shaft for an internally illuminated pointer.

It is another object of this invention to provide an internally illuminated pointer provided with a pair of opposed dual function light collecting and reflecting faces acting in combination with each other to prevent light collected by one face to escape through the other face.

It is a particular object of this invention to provide a light conducting cylindrical shaft having a light collecting surface characterized by having diametrically opposed substantially non-parallel faces.

It is a general object of this invention to provide an improved structure for efficiently internally illuminating a light conducting instrument pointer.

Other objects and advantages of the invention will become more fully apparent from the following description taken in conjunction with the accompanying drawings, wherein.

Figure 1:
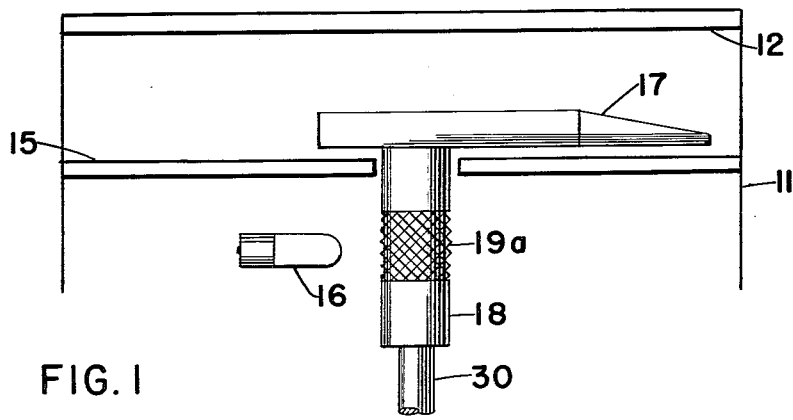
FIGURE 1 is a side elevational view of a typical pointer and shaft structure of this invention shown in operating relationship to a dial structure.

Referring now to FIGURE 1 there is indicated a casing 11. The front face of the casing is closed by a transparent glass or plastic window 12. The device includes a dial 15 having indicia engraved thereon.

Associated with the dial is a movable pointer 17 mounted on a shaft 18. Both shaft and pointer are formed of a light transmitting glass or plastic. Light from source 16, intercepted by shaft 18, is transmitted to pointer 17.

It has been found that by forming a plurality of facets 19a on the surface of the shaft, the brightness of the pointer is perceptibly increased.

A transparent solid with approximately parallel walls allows incident light to leave the solid on the opposite side. By applying facets, the diametrically opposed walls are no longer parallel to each other. A large part of the total entering light is reflected back from the inside opposite wall and is dispersed to be propagated along the solid shaft to the pointer.

Figures 2, 3, 4:
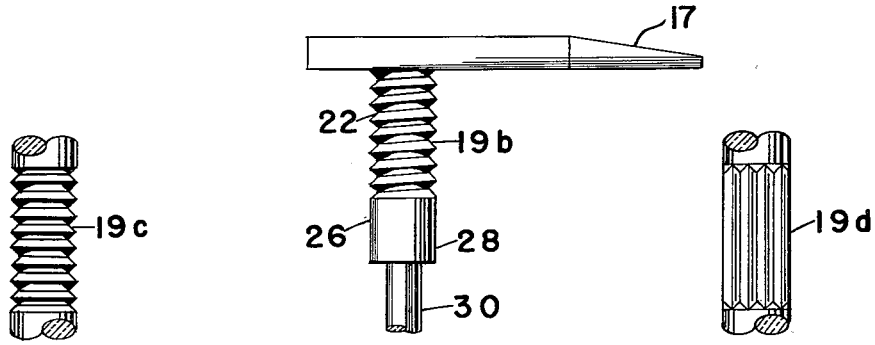
FIGURE 2 is a side elevational view of a pointer-shaft assembly employing an alternate shaft construction.
FIGURE 3 is a side elevational view of a portion of an alternate light transmitting shaft construction suitable for the practice of this invention.
FIGURE 4 is a side elevational view of a portion of another alternate light transmitting shaft construction suitable for the practice of this invention.

In FIGURES 2, 3, and 4 still other forms of facets 19b, 19c, 19d respectively, found suitable for the practice of this invention are disclosed.

For smaller dimension shafts say ⅙ inch and smaller, difficulties in fabrication exist, therefore, it is advantageous in many instances to employ the preferred embodiment shown in FIGURE 2, wherein a portion of the shaft is threaded by means of a conventional die cutting operation to provide the faceted surface. It is to be noted that the thread 22 extends only partially along the shaft surface and that the pointer 17 is affixed to the threaded end of the shaft. This construction is important since it permits retention of a maximum amount of material at the lower end 28 of the shaft 26 to facilitate the securing of the shaft to a drive mechanism. The conventional means of attaching the pointer shaft to a drive mechanism is by inserting a drive mechanism shaft 30 into a bore 61 formed in the pointer shaft 26.

Figure 5:
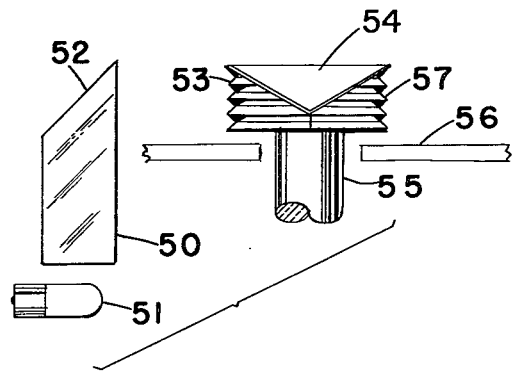
FIGURE 5 is a pictorial showing of an indirect light system in conjunction with a further embodiment of a pointer adapted to be illuminated directly from the indirect light source. The pointer is shown oriented in a front view.

In FIGURE 5 a light transmitting member 50 is shown receiving light from a lamp 51. The light is transmitted through the body 50 and is reflected by surface 52 toward face 53 of pointer 54. Shaft 55 of pointer 54 extends through dial face 56. Light received by face 53 passes through the pointer and is dispersed back into the body of the pointer by the facets on opposite face 57.

Applicants sharply distinguish over such prior devices by providing facets on the sides of the pointer opposite to the light source thereby reflecting back into the body of the pointer, light which would otherwise be ineffective for illuminating the pointer.

Having thus disclosed our invention, what is claimed is:
1. An illuminated pointer apparatus for an indicator comprising: a light source; a light conducting shaft having a multifaced knurl having facets lying in intersecting planes arranged to receive light from said light source; and a light conducting pointer member attached to said shaft, said pointer having a normally viewed surface adapted to be internally illuminated by light transmitted by said shaft to said pointer member.

2. A pointer apparatus comprising: a light conducting shaft having at least a portion thereof provided with plurality of facets so as to present a plurality of light receiving faces at different angles to a source of light, and a light conducting pointer attached to said shaft, said pointer having a viewing face adapted to be internally illuminated by light conducted by said shaft to said pointer.

References Cited in the file of this patent

UNITED STATES PATENTS

| | | |
|---|---|---|
| 2,280,700 | Hall | Apr. 21, 1942 |
| 2,285,374 | Dohmann | June 2, 1942 |
| 2,287,605 | Dickson | June 23, 1942 |
| 2,672,551 | Hale | Mar. 16, 1954 |
| 2,831,453 | Hardesty | Apr. 22, 1958 |
| 2,902,970 | Kadlec | Sept. 8, 1959 |

UNITED STATES PATENT OFFICE

CERTIFICATE OF CORRECTION

Patent No. 3,005,439            October 24, 1961

Warren H. Ellenwood et al.

It is hereby certified that error appears in the above numbered patent requiring correction and that the said Letters Patent should read as corrected below.

Column 2, line 30, for "1/6 inch" read -- 1/8 inch --.

Signed and sealed this 3rd day of April 1962.

(SEAL)
Attest:

ERNEST W. SWIDER            DAVID L. LADD
Attesting Officer            Commissioner of Paten